United States Patent [19]

Klatt

[11] Patent Number: 5,548,329
[45] Date of Patent: Aug. 20, 1996

[54] PERCEPTUAL DELTA FRAME PROCESSING

[75] Inventor: Robert W. Klatt, Rancho Palos Verdes, Calif.

[73] Assignee: Hughes Aircraft Company, Los Angeles, Calif.

[21] Appl. No.: 372,724

[22] Filed: Jan. 17, 1995

Related U.S. Application Data

[63] Continuation of Ser. No. 953,445, Sep. 29, 1992, abandoned.

[51] Int. Cl.$^6$ ........................................... H04N 9/12
[52] U.S. Cl. ................................................... 348/164
[58] Field of Search ........................... 348/701, 606–607, 348/626–627, 678, 164–165, 167–168; 358/113, 330–334, 169, 171, 174, 177; H04N 9/12

[56] References Cited

U.S. PATENT DOCUMENTS

| | | | |
|---|---|---|---|
| 3,676,589 | 7/1972 | Jetzt | 348/607 |
| 3,742,238 | 6/1973 | Hoffman | 250/347 |
| 4,072,863 | 2/1978 | Roundy | 250/332 |
| 4,142,205 | 2/1979 | Iinuma | 348/394 |
| 4,178,612 | 12/1979 | Dudley et al. | 358/113 |
| 4,318,129 | 3/1982 | Zwirn | 358/174 |
| 4,400,718 | 8/1983 | Lee | 348/394 |
| 4,617,593 | 10/1986 | Dudley | 348/164 |
| 4,667,239 | 5/1987 | Dundley et al. | 348/627 |
| 4,979,035 | 12/1990 | Uehara et al. | 358/98 |

*Primary Examiner*—Tommy P. Chin
*Assistant Examiner*—Vu Le
*Attorney, Agent, or Firm*—Michael W. Sales; Wanda K. Denson-Low

[57] ABSTRACT

A perceptual delta frame processor for use with a detector array and a noninterlaced video display that produces an image equivalent to that of an image difference processing system. The processor includes a responsivity equalization circuit for processing output signals provided by the detector array that equalize the relative response of its detector elements and provide equalized output signals. A multiplier circuit is provided for inverting the polarity of alternate images to provide constant polarity signals. A contrast control circuit is provided for processing the constant polarity signal to produce optimized video signals that are applied to the noninterlaced video display at a repetition rate above its flicker fusion frequency. Consequently, alternate video frames are averaged by the eye-brain system of an observer, who perceives an image having the quality that is equivalent to an image difference processing system. The present invention provides the benefits of image difference processing, or delta frame processing, without incurring the cost of analog to digital and digital to analog conversion and digital frame storage when it is employed with chopped, thermal detectors such a pyroelectric and bolometer imaging arrays.

6 Claims, 2 Drawing Sheets

PERCEPTUAL DELTA FRAME PROCESSING

This is a continuation application Ser. No. 07/953,445 filed Sep. 29, 1992 now abandoned.

BACKGROUND

The present invention relates to video systems employing chopped, thermal detectors, and more particularly, to perceptual image difference or delta frame processing for use with such video systems.

Conventional image difference and delta frame processing techniques employed in video systems store each image frame and subtract it from the subsequent image frame to produce a difference signal $\Delta s$ given by: $\Delta s=2[(-1)^{(N+1)}-(-1)^N]\beta\Delta T=2(-1)^N\beta\Delta T$. In this equation N is the frame number, and $\beta\Delta T$ is a signal that is proportional to the temperature difference between the scene and a chopper blade used in the conventional video system, and is given by the equation $[\beta \times \Delta T(\text{chopper}-\text{scene})]$. The conventional video systems alternate the sign of the difference signal $\Delta s$ to produce a final result, comprising a video signal that is provided to a video display for viewing.

Typical of such conventional video systems employing image difference and delta flame processing are systems described in "Improved Performance from PyroElectric Vidicons by Image-Difference Processing", *IEEE Symp. on Appl. of FerroElectrics*, June 1975, and U.S. Pat. No. 4,178,612 entitled "Delta Frame Circuit" issued to Dudley et at.

It is therefore an objective of the present invention to provide a system and method for use with chopped, thermal detectors, and the like, that provides the same performance benefits as image difference or delta frame processing.

SUMMARY OF THE INVENTION

In order to provide for the above and other objectives, the present invention provides for a perceptual delta frame processor for use with a detector array and a noninterlaced video display. The perceptual delta frame processor produces an image equivalent to that of a conventional image difference processing system. The processor comprises responsivity equalization circuitry for processing output signals provided by the detector array to equalize the relative response of its detector elements and provide equalized output signals therefrom. Multiplier circuitry is coupled to the responsivity equalization circuitry for inverting the polarity of alternate images to provide constant polarity signals.

Contrast control circuitry is provided for processing the constant polarity signal to produce optimized video signals that are applied to the noninterlaced video display at a repetition rate above its flicker fusion frequency. Consequently, alternate video frames are averaged by the eye-brain system of an observer, who perceives an image having the quality that is equivalent to a conventional image difference processing system.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
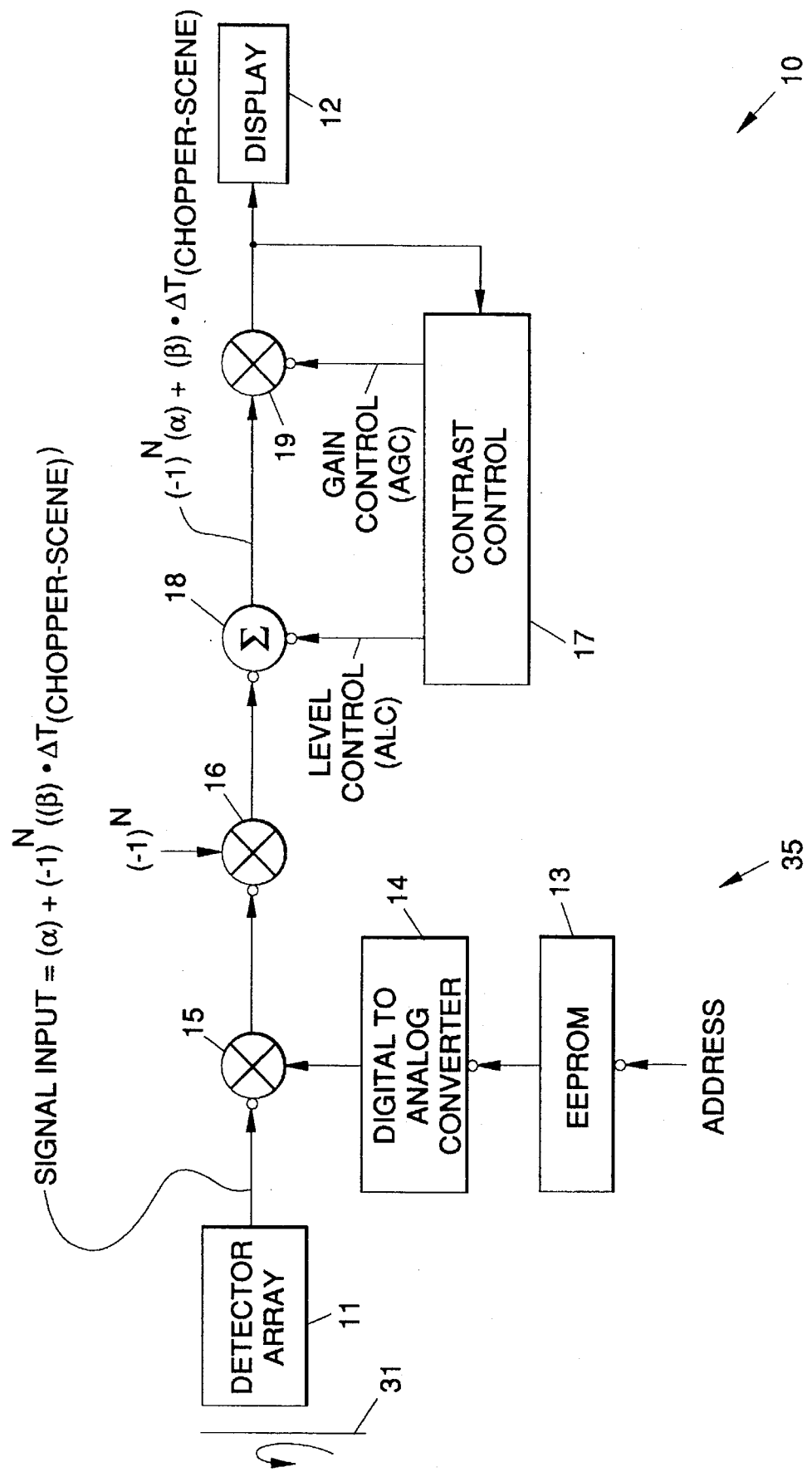
FIG. 1 shows a perceptual delta frame processing system in accordance with the principles of the present invention.

By way of introduction, FIG. 1 shows a perceptual delta frame processing system 10 in accordance with the principles of the present invention. The individual detector element output signals of a chopped thermal detector array 11 employing a rotating chopper blade 31, such as a pyroelectric or bolometer imaging array, for example, are the sum of offsets ($\alpha$) that are constant from frame to frame, and a signal ($\beta\Delta T$) that is proportional to the temperature difference between a scene and the chopper blade 31 employed with the detector array 11 (stated above in the Background section). The polarity of this output signal alternates between frames. If "N" is the frame number, then the output signal (s) is given by:

$$\Delta s = \alpha + (-1)^N \beta \Delta T.$$

Conventional image difference and delta frame processing systems store each image provided by the detector array 11 and subtract it from the next image to produce a difference signal $\Delta s$, given by:

$$\Delta s = 2[(-1)^{(N+1)} - (-1)^N]\beta\Delta T = 2(-1)^N\beta\Delta T.$$

The conventional systems then alternate the sign of the difference signal $\Delta s$ to produce a final result. The final signal is applied to a display.

In perceptual delta frame processing in accordance with the principles of the present invention, the polarity of alternate images is inverted to produce a video signal (x) given by:

$$x = (-1)^N[\alpha + (-1)^N \beta \Delta T].$$

The video signal (x) is used to drive a noninterlaced video display 12 at a repetition rate above its flicker fusion frequency. Alternate frames are averaged by the eye-brain system of an observer, who perceives an image equivalent to that of image difference processing systems, which is given by:

$$x = 2\beta\Delta T.$$

Referring again to FIG. 1, the output signals (s) from the detector array 11 are combined with signals produced by responsivity equalization circuitry 35 in a first multiplier 15. The responsivity equalization circuitry 35 comprises an appropriately addressed EEPROM memory 13 including a look-up table, and a digital to analog converter 14 that converts each addressed value in the look-up table into an analog signal that is combined with the output signal from the detector array 11 in the first multiplier 15. The analog signals are combined in a sequential manner with the output signals from the detector array 11 such that the relative response between detector elements of the detector array 11 is equalized. This is generally well-known to those skilled in the thermal imaging art. The output signals from the first multiplier 15 is applied to a second multiplier 16 which multiplies the output signal by a factor equal to $(-1)^N$, where N is the frame number. The polarity of alternate images is inverted by the second multiplier 16. This produces the signal x defined by the equation:

$$x=(-1)^N[\alpha+(-1)^N\beta\Delta T]=(-1)^N(\alpha)+\beta\Delta T.$$

A conventional contrast controller 17 is used to optimize the video signal for the display. This is achieved through the use of a summer 18 that applies a level control signal to the video signal and by a third multiplier 19 which applies a gain control signal to the video signal. The contrast controller 17 and its workings are generally well-known to those skilled in the video an and will not be described in detail. However, conventional analog circuitry, such as those used in video cameras may be used to perform the contrast control, automatic level control (ALC) and automatic gain control (AGC) calculations performed in the contrast controller 17, for example. The output of the third multiplier 19 (an optimized video signal) is applied to the noninterlaced display 12 for viewing.

Figure 2:
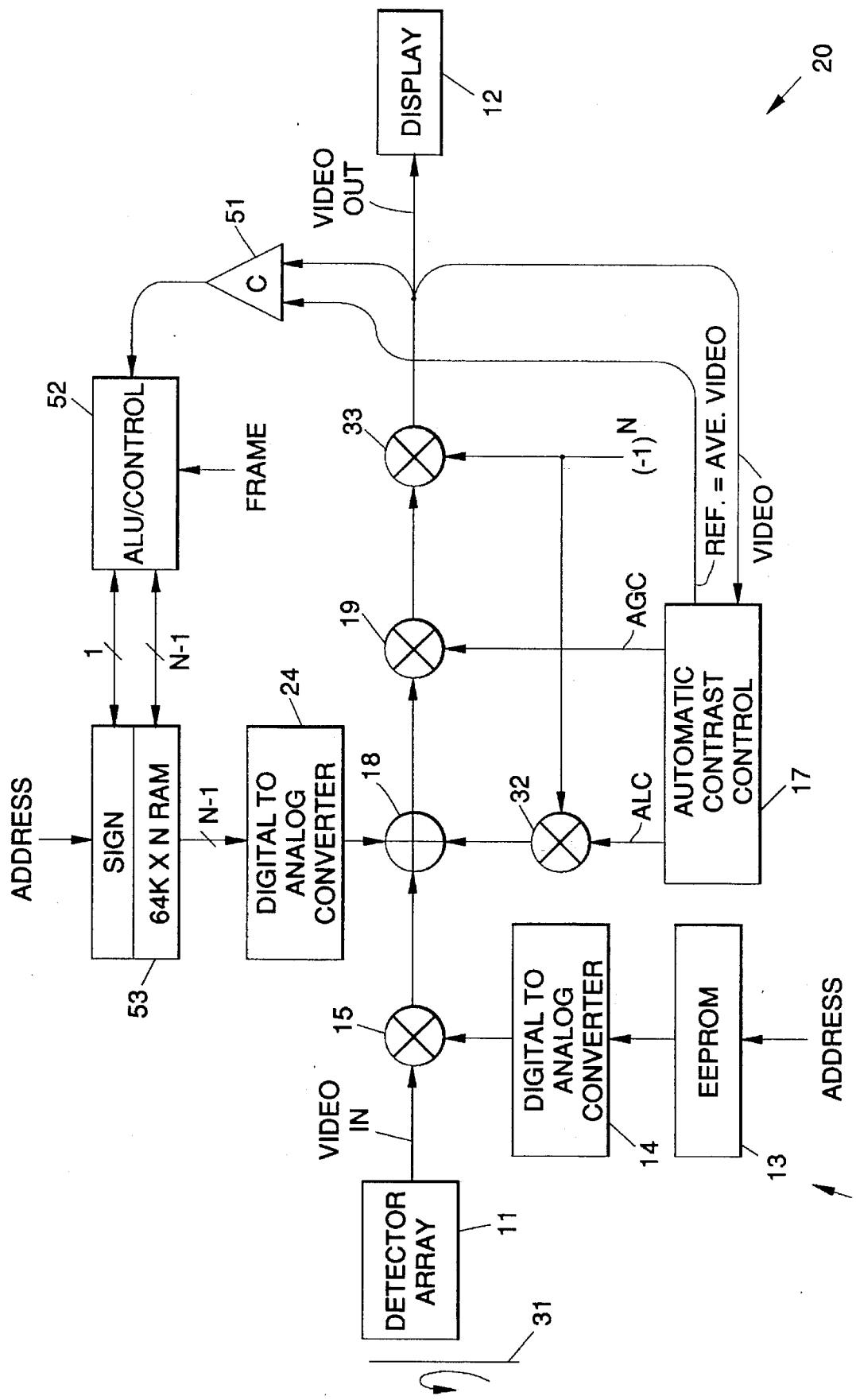
FIG. 2 is a second embodiment of a delta frame processor in accordance with the principles of the present invention.

FIG. 2 shows a second embodiment of a delta frame processor 20 in accordance with the principles of the present invention. Multiplier circuitry 19, 32, 33 is coupled to the responsivity equalization circuitry 35 for reversing the polarity of alternate fields of equalized video output signals derived from the responsivity equalization circuitry 35. This, in effect, rectifies the alternating polarity thermal signals from the detector array 11, caused by to the rotating chopper blade 31.

The display 12 is at best piece-wise linear, since for all inputs beyond some minimum (which can be assumed to be zero), the output brightness of the display 12 is zero. If the average pixel input is near zero, an individual pixel signal including a small offset may saturate (go beyond zero) on alternate fields. This could compromise the perceptual averaging process. Measuring the pixel offsets and then calculating and storing corrections that are added to each video pixel prior to display minimizes the probability of this happening. This is provided for in the present invention.

FIG. 2 shows a second embodiment of a perceptual delta frame processor 20 in accordance with the principles of the present invention. The perceptual delta frame processor 20 includes a memory 53 for storing offset correction signals (correction constants), a digital to analog converter 24 for convening the stored correction constants to voltages or currents, and an adder 18 for combining the electronic offset correction constants with the video signals derived from the detector array 11. The memory 53 may be a nonvolatile memory, such as an EEPROM, for example, and the offset correction signals may be obtained during calibration and never changed. Alternatively, the offset correction signals may be continuously updated to correct for thermal drift, and aging, etc., of the detector array 12. The embodiment of FIG. 2 also includes a simple approach that provides for continuous operation.

The automatic contrast control 17 provides the ensemble average of all pixels comprising the video signals to a comparator 51 as a reference input. The comparator 51 compares each pixel output value to the reference value, and the result of the comparison is then compared to the result arrived at for the previous field in an arithmetic logic and control unit 52 or ALU/control unit 52, and is stored as a single bit in the memory 53. If, for a particular pixel, the offset value is less than the difference between the average pixel value and the reference value (the average for all pixels) the output of the comparator 51 for that pixel will not change from field to field; it will be a continuous stream of logical zeros or ones. If, however, the offset is greater than the difference, the result of the comparison will alternate with the fields, generating (for a large offset to difference ratio) a frame frequency square wave whose phase, relative to the odd and even fields (defined by whether the detector array 11 views a scene or the chopper blade 31), indicates the polarity of the offset. An inter-field offset polarity change (logically a "01" or a "10" sequence) causes the ALU/control unit 52 to update the offset constants stored in the memory 53, whereas a "00" or a "11" sequence leaves the constants unchanged.

As may be seen in the above-described embodiments, perceptual delta frame processing results from the use of the present systems 10, 20 wherein the polarity of alternate images is inverted to produce a video signal that is applied to a linearized, noninterlaced display 12 that is operated at a repetition rate above its flicker fusion frequency. The resulting video images viewed by an operator on the display 12 are comparable to video images generated by conventional image difference systems. Accordingly, a more cost effective system is thus provided by the present invention.

Thus there has been described new and improved perceptual image difference or delta frame processing systems for use with such video systems. It is to be understood that the above-described embodiments are merely illustrative of some of the many specific embodiments which represent applications of the principles of the present invention. Clearly, numerous and other arrangements can be readily devised by those skilled in the art without departing from the scope of the invention.

What is claimed is:

1. A perceptual delta frame processing system for use with a chopped detector array that produces an image substantially equivalent to that of an image difference processing system, wherein output signals of detector elements of the chopped detector array are the sum of offsets ($\alpha$) that are constant from frame to frame, and an image signal ($\beta\Delta T$) that is proportional to the temperature difference between a scene and a chopper, wherein said perceptual delta frame processing system comprises:

responsivity equalization circuitry for processing the output signals from the detector array to equalize the relative response of the detector elements wherein said responsivity equalization circuitry comprises
a second multiplier;
a first memory comprising a look-up table comprising correction constants; and
a digital to analog converter coupled between the second multiplier and the first memory for converting addressed values in the look-up table into analog signals that are combined with the output signals from the detector array;

a first multiplier coupled to the responsivity equalization circuitry for inverting the polarity of alternate image frames and thus provide constant polarity signals, wherein the constant offsets ($\alpha$) are canceled when viewed by an observer;

contrast control circuitry for processing the constant polarity signals to produce optimized video signals containing inverted and non-inverted offsets wherein said contrast control circuitry comprises
a contrast control circuit for providing automatic level control and automatic gain control signals;
a summing circuit coupled to the contrast control circuit and to the first multiplier for combining the automatic level control signal and the constant polarity signals to produce a level adjusted signal; and a third multiplier coupled to the contrast control circuit and to the summing circuit for combining the automatic gain control signal and the level adjusted signals to provide the optimized video signals;

a noninterlaced video display that receives said optimized video signals at a repetition rate above its flicker fusion frequency;

a comparator for processing the optimized video signals and reference signals provided by the contrast control circuit, and for providing comparison output signals that are indicative of the difference therebetween;

an arithmetic logic and control unit for comparing a current comparison output signal and the comparison output signal for the previous field, and for providing a second output signal indicative of the comparison, which second output signal comprises an updated offset constant;

a memory coupled to the arithmetic logic and control unit for storing updated offset constants wherein the arithmetic logic and control unit is adapted to update the offset constants stored in the memory based upon an inter-field offset polarity change; and a digital to analog converter coupled between the memory and the summing circuit, wherein offsets in alternate video frames are averaged out by the eye-brain system of the observer, who perceives an image having the quality that is substantially equivalent to the image difference processing system.

2. The perceptual delta frame processing system of claim 1 wherein the reference signals comprise an ensemble average of the optimized video signals.

3. The perceptual delta frame processing system of claim 1 wherein the contrast control circuit comprises:

automatic level control circuitry for outputting automatic level control signals in response to the video output signals, and automatic gain control circuitry for outputting automatic gain control signals in response to the video output signals.

4. A perceptual delta frame processing system for use with a chopped detector array that produces an image substantially equivalent to that of an image difference processing system, wherein output signals of detector elements of the chopped detector array are the sum of offsets ($\alpha$) that are constant from frame to frame, and an image signal ($\beta\Delta T$) that is proportional to the temperature difference between a scene and a chopper, wherein said perceptual delta frame processing system comprises:

responsivity equalization circuitry for processing the output signals from the detector array to equalize the relative response of the detector elements wherein said responsivity equalization circuitry comprises
a second multiplier;
a first memory comprising a look-up table comprising correction constants; and
a digital to analog converter coupled between the second multiplier and the first memory for converting addressed values in the look-up table into analog signals that are combined with the output signals from the detector array;

a first multiplier coupled to the responsivity equalization circuitry for inverting the polarity of alternate image frames and thus provide constant polarity signals, wherein the constant offsets ($\alpha$) are canceled when viewed by an observer;

contrast control circuitry for processing the constant polarity signals to produce optimized video signals containing inverted and non-inverted offsets wherein said contrast control circuitry comprises
a contrast control circuit for processing the constant polarity signals to provide automatic level control and automatic gain control signals; and
means for combining the automatic level control and automatic gain control signals with the constant polarity signals to produce the optimized video signals.

a third multiplier coupled to the contrast control circuit and to the summing circuit for combining the automatic gain control signal and the level adjusted signals to provide the optimized video signals;

a noninterlaced video display that receives said optimized video signals at a repetition rate above its flicker fusion frequency;

a comparator for processing the optimized video signals and reference signals provided by the contrast control circuit, and for providing comparison output signals that are indicative of the difference therebetween;

an arithmetic logic and control unit for comparing a current comparison output signal and the comparison output signal for the previous field, and for providing a second output signal indicative of the comparison, which second output signal comprises an updated offset constant;

a memory coupled to the arithmetic logic and control unit for storing updated offset constants wherein the arithmetic logic and control unit is adapted to update the offset constants stored in the memory based upon an inter-field offset polarity change; and a digital to analog converter coupled between the memory and the summing circuit, wherein offsets in alternate video frames are averaged out by the eye-brain system of the observer, who perceives an image having the quality that is substantially equivalent to the image difference processing system.

5. The perceptual delta frame processing system of claim 4 wherein the reference signals comprise an ensemble average of the optimized video signals.

6. The perceptual delta frame processing system of claim 4 wherein the contrast control circuit comprises:

automatic level control circuitry for outputting automatic level control signals in response to the video output signals, and automatic gain control circuitry for outputting automatic gain control signals in response to the video output signals.

* * * * *